(12) United States Patent
Cheng

(10) Patent No.: US 9,644,769 B1
(45) Date of Patent: May 9, 2017

(54) SYSTEM AND METHOD FOR WELDING TUBULAR WORKPIECES

(71) Applicant: Paul Po Cheng, London (CA)

(72) Inventor: Paul Po Cheng, London (CA)

( * ) Notice: Subject to any disclaimer, the term of this patent is extended or adjusted under 35 U.S.C. 154(b) by 569 days.

(21) Appl. No.: 14/220,508

(22) Filed: Mar. 20, 2014

Related U.S. Application Data

(60) Provisional application No. 61/803,596, filed on Mar. 20, 2013.

(51) Int. Cl.
  *B23K 13/01* (2006.01)
  *F16L 9/02* (2006.01)
  *B23K 31/02* (2006.01)

(52) U.S. Cl.
  CPC ............... *F16L 9/02* (2013.01); *B23K 31/02* (2013.01)

(58) Field of Classification Search
  CPC ........ B23K 31/02; B23K 13/00; B23K 13/02; B23K 13/025; B23K 13/06; B23K 13/08; F16L 9/02; H05B 6/06; H05B 6/14; H05B 6/36; H05B 6/101; H05B 6/104; H05B 6/105; H05B 6/362; H05B 6/365
  USPC ....... 219/602, 603, 606, 607, 611, 612, 617, 219/633, 622, 671, 610
  See application file for complete search history.

(56) References Cited

U.S. PATENT DOCUMENTS

| | | | |
|---|---|---|---|
| 4,555,053 A | 11/1985 | Persson et al. | |
| 5,208,443 A | 5/1993 | McGaffigan | |
| 5,240,167 A | 8/1993 | Ferte et al. | |
| 5,350,902 A * | 9/1994 | Fox .......................... | H05B 6/14 219/633 |
| 5,374,808 A * | 12/1994 | Coultrip ................... | G01N 3/00 219/633 |
| 5,699,955 A | 12/1997 | Shimizu et al. | |
| 5,831,252 A | 11/1998 | Shimizu | |
| 6,637,642 B1 | 10/2003 | Lingnau | |
| 7,086,960 B2 | 8/2006 | Huang et al. | |
| 7,348,523 B2 | 3/2008 | Slack et al. | |
| 7,752,728 B2 | 7/2010 | Schedler et al. | |
| 7,931,184 B2 | 4/2011 | Lingnau et al. | |

(Continued)

FOREIGN PATENT DOCUMENTS

| WO | WO94/15445 A2 | 7/1994 |
|---|---|---|
| WO | WO97/32686 A1 | 9/1997 |

*Primary Examiner* — Hung D Nguyen

(57) ABSTRACT

A method of joining metal workpieces together. The method includes an intermediate metal workpiece between first and second metal workpieces to define gaps therebetween, and positioning induction coils in the gaps. The induction coils are energized, to heat hot portions in the first and second workpieces and intermediate hot portions in the intermediate workpiece in a non-oxidizing atmosphere to at least a hot working temperature. The induction coils are removed from the gaps, and the intermediate workpiece is rotated about an axis thereof. Contact surfaces on the first and second workpieces are pressed against the intermediate contact surfaces of the intermediate workpiece respectively while the intermediate workpiece is rotating, for plastic deformation of at least part of the metal in the hot portions and in the hot intermediate portions. The first, second, and intermediate workpieces are cooled to bond the first and second metal workpieces and the intermediate workpiece together.

17 Claims, 13 Drawing Sheets

(56) References Cited

U.S. PATENT DOCUMENTS

2009/0256349 A1* 10/2009 Strubin .............. B29C 45/1459
219/617
2010/0108666 A1 5/2010 Gafri et al.
2011/0284523 A1 11/2011 Hiroyama et al.

* cited by examiner

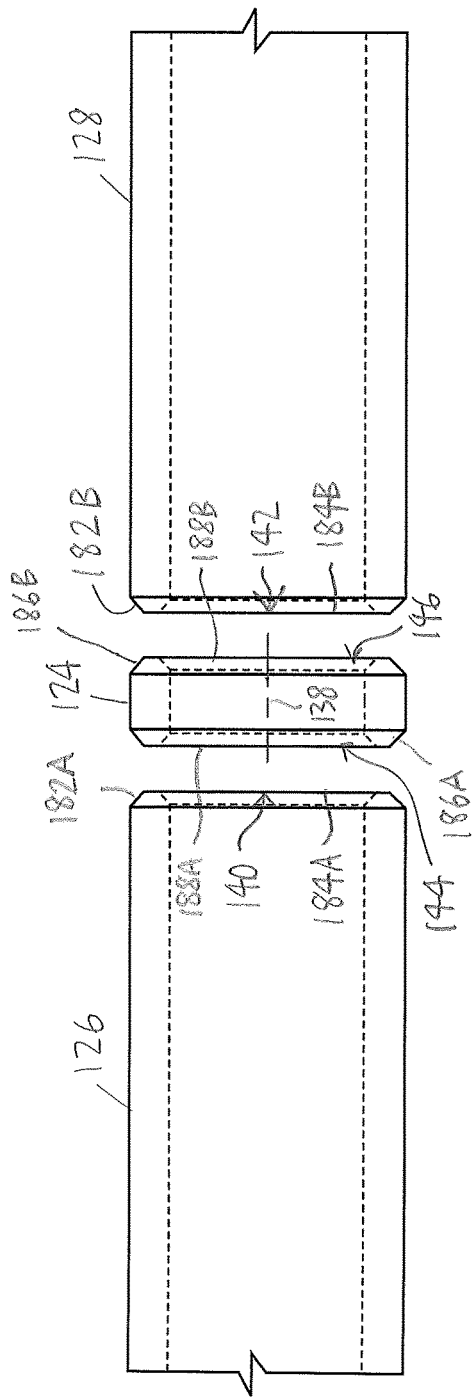
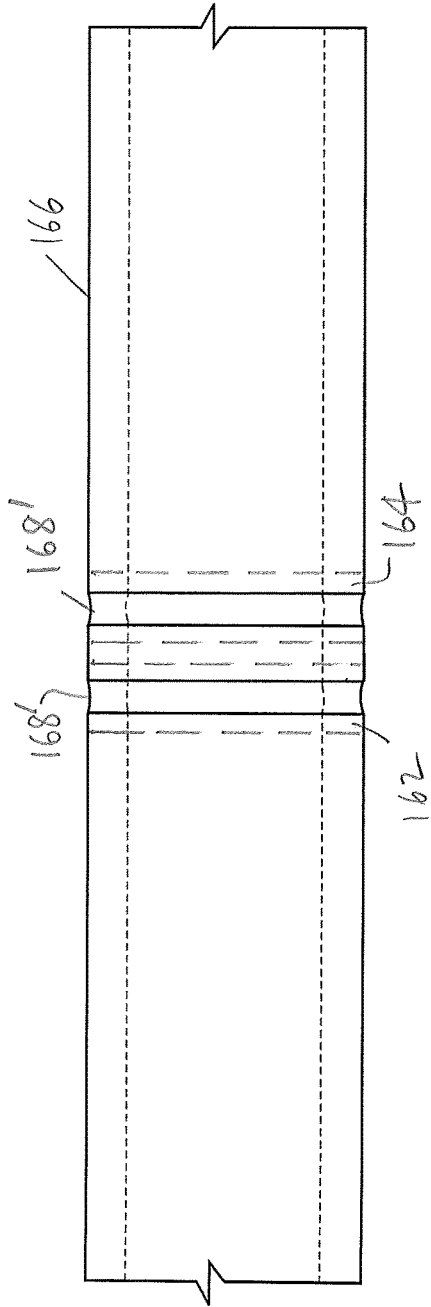
FIG. 9A
FIG. 9B

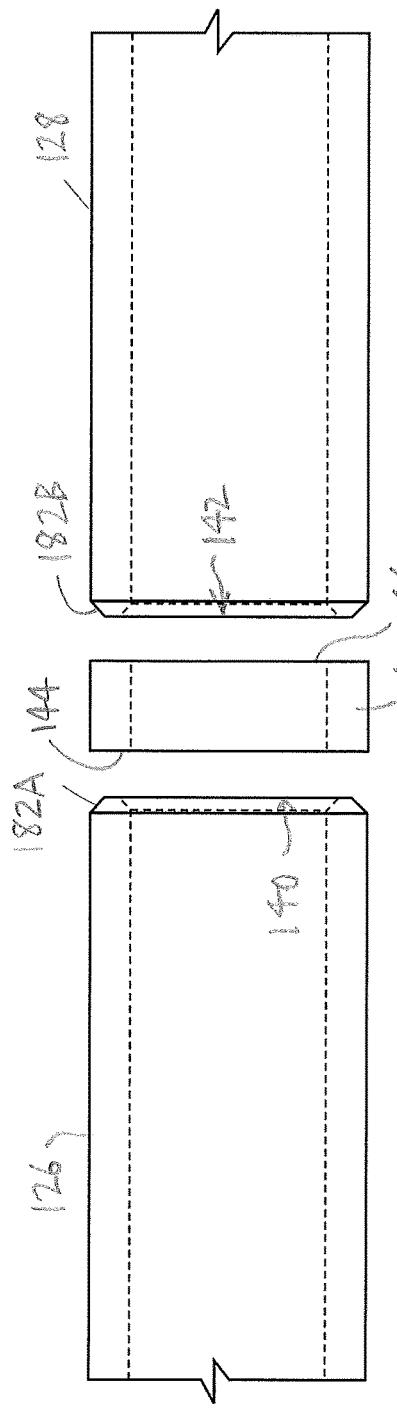
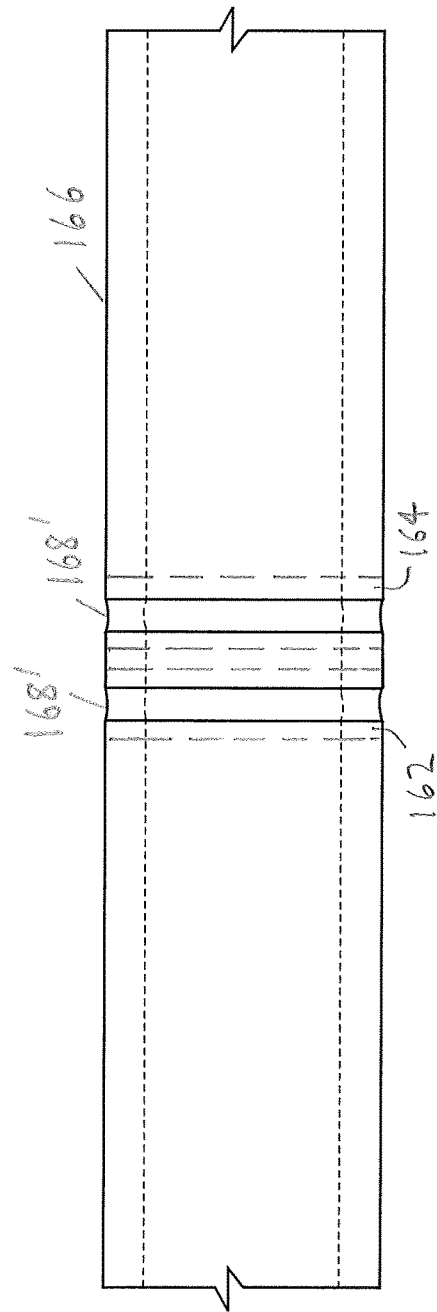
FIG. 9C
FIG. 9D

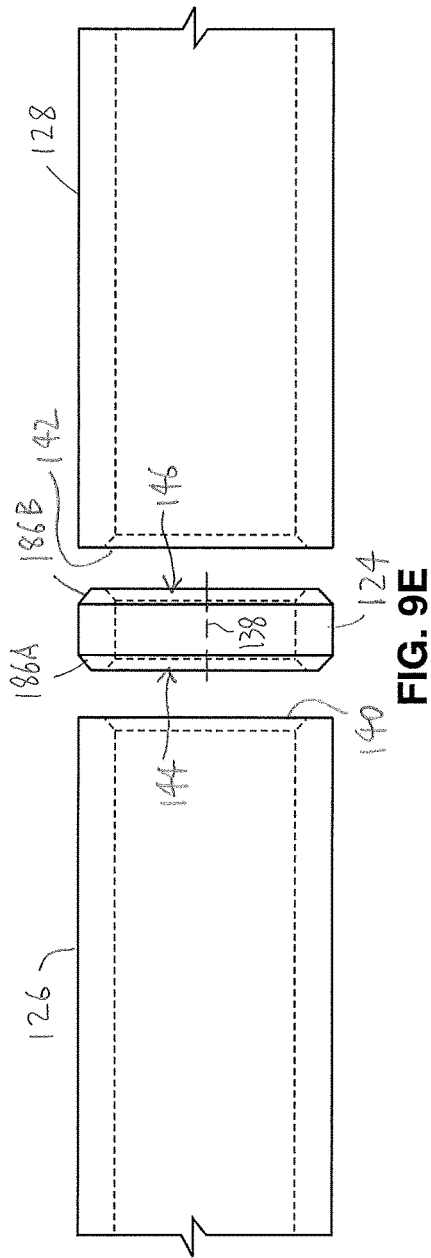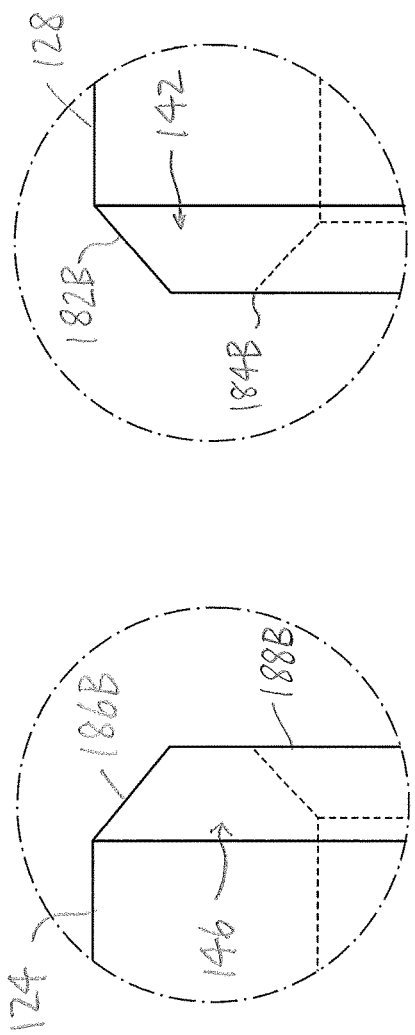

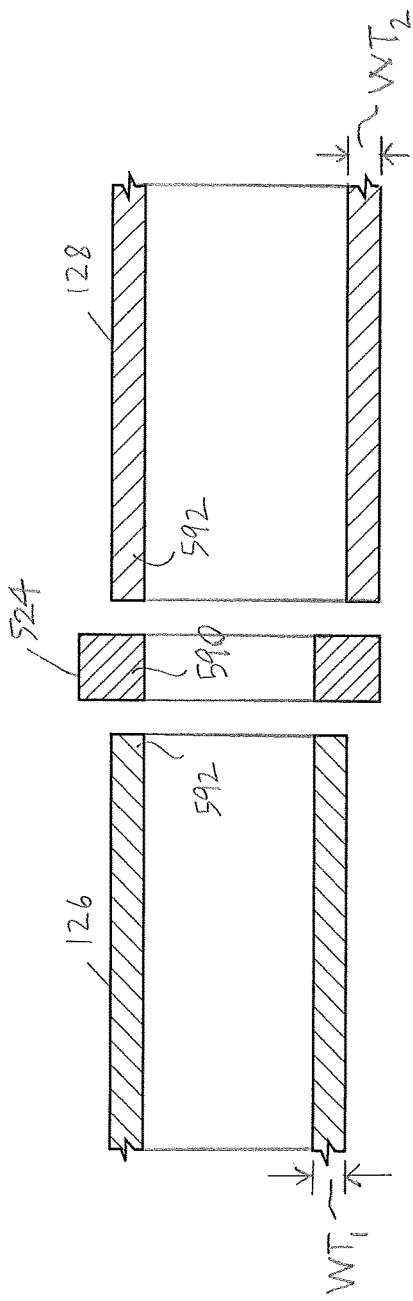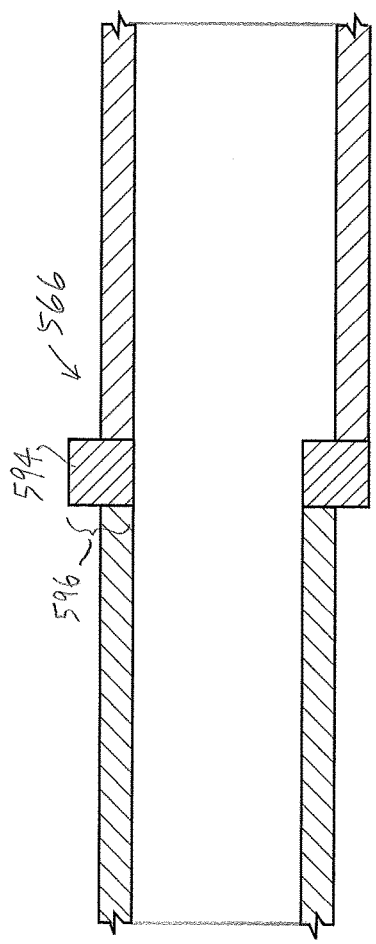
FIG. 10A
FIG. 10B

SYSTEM AND METHOD FOR WELDING TUBULAR WORKPIECES

This application claims priority from U.S. Provisional Patent Application No. 61/803,596, filed on Mar. 20, 2013, the entire disclosure whereof is hereby incorporated by reference herein.

FIELD OF THE INVENTION

The present invention is a system and a method for joining metal workpieces together.

BACKGROUND OF THE INVENTION

As is known in the art, metal parts having opposed substantially planar and parallel surfaces may be welded together by a process described as solid state welding. A method of solid state welding is disclosed by U.S. Pat. No. 6,637,642 (Lingnau).

As an example, a conventional method of solid state welding two tubular workpieces together is illustrated in FIG. 1. (As will be described, the balance of the drawings illustrate the present invention.) Two metal workpieces to be welded together using the solid state welding method of the prior art are identified in FIG. 1 as "$W_1$" and "$W_2$". Typically, the workpieces "$W_1$" and "$W_2$" include open ends having substantially planar surfaces facing each other. After the ends of the two workpieces are heated to a suitable temperature (i.e., a hot working temperature) by one or more induction coils in a non-oxidizing atmosphere, the induction coil is removed. The ends are pushed together axially, quickly and with some force, and as they engage each other, one or both of the workpieces is rotated about a central axis thereof. This prior art method has been found to be very effective, and has a number of advantages over other known welding techniques.

The induction heating heats a layer of each workpiece, from the open end of the workpiece inwardly, sufficiently to make the material soft enough that it can be plastically deformed when the ends are brought together. The relatively "soft" heated layers at the ends of the workpieces are pushed together axially, and simultaneously, one or both of the workpieces is rotated, subjecting the material in the heated layers to shear stresses. Because they are at the hot working temperature (at a minimum), the contact surfaces of the workpieces tend to adhere to each other when they engage. The shearing action results from the contact surfaces adhering to each other while at least one of the workpieces rotates. It is believed that this shearing action, in a non-oxidizing atmosphere (e.g., a nitrogen atmosphere), tears the microstructure of the metal in the heated layers at the ends of the workpieces "$W_1$", "$W_2$" apart. Recrystallization of the material in the heated layers at the workpiece ends takes place as the metal cools. It is also believed that the engagement of the heated metal from the workpieces "$W_1$" and "$W_2$" and its recrystallization results in a relatively uniformly fine-grained region that is integrally formed with both of "$W_1$" and "$W_2$".

This type of bond has a number of advantages over the bonds formed using other welding methods. For instance, the bonds formed using this prior art method have good axial, radial, and circumferential uniformity. The welds provided are substantially free of notches or other irregularities, with smooth profiles on both inner and outer diameters. Post-weld stress relief and post-weld machining are eliminated. Stress risers (e.g., centerline grooves, or toe grooves) are also eliminated. Also, no filler material is needed.

As is known in the art, where the pipe has a larger diameter and/or a thicker wall, multiple segmented induction coils may be used, in order to provide sufficient heat. For the purposes hereof, a reference to "the" induction coil will be understood to refer to one and/or more than one induction coil, depending on whether a multiple segmented induction coil or some other arrangement involving a number of induction coils is used.

As can be seen in FIG. 1, the workpieces "$W_1$", "$W_2$" may be, for example, at least partially tubular, e.g., metal pipe. The workpieces "$W_1$", "$W_2$" have respective bodies 10A, 10B with substantially planar end surfaces 12A, 12B at their respective ends 14A, 14B. The workpieces "$W_1$", "$W_2$" are positioned so that the respective end surfaces 12A, 12B are facing each other. The bodies 10A, 10B are tubular and substantially cylindrical, and respective axes 16A, 16B defined by the bodies 10A, 10B are substantially aligned. The surfaces 12A, 12B and at least parts of the bodies 10A, 10B proximal to the ends 12A, 12B are heated by passing current through the induction coil (not shown in FIG. 1) that is located in a gap 18 between the respective ends 14A, 14B. As is well known in the art, the heating takes place in a non-oxidizing atmosphere. Once the surfaces 12A, 12B have been heated to the hot working temperature of the workpieces "$W_1$", "$W_2$", the induction coil is removed from the gap 18, and the workpieces "$W_1$", "$W_2$" are quickly rammed together, i.e., the workpiece "$W_1$" is moved in the direction indicated by arrow "A", and/or the workpiece "$W_2$" is moved in the direction indicated by arrow "B" in FIG. 1. When the workpieces are brought together, a selected one of the workpieces is rotated about its axis in the direction indicated by arrow "C" in FIG. 1, to provide a favorable microstructure, as described above. Alternatively, both of the workpieces may be rotated in opposite directions about their axes when the workpieces are brought together, to provide the desired microstructure.

From the foregoing, it can be seen that the conventional solid state welding technique is suitable only where one or both of the workpieces can be rotated. However, in certain circumstances (e.g., where long segments of pipe are to be joined together, for instance, when laying a pipeline), rotation of one or both of the workpieces is not feasible.

SUMMARY OF THE INVENTION

There is a need for a system and a method that overcome or mitigate one or more of the disadvantages or defects of the prior art. Such disadvantages or defects are not necessarily included in those listed above.

In its broad aspect, the invention provides a system for joining metal workpieces together. The system includes an intermediate clamp, for securely engaging an intermediate tubular workpiece positioned between two workpieces to define respective gaps between tubular open ends thereof, and for at least partially rotating the intermediate workpiece about an axis thereof, each of the two tubular workpieces having one or more contact surfaces at the open end thereof facing respective intermediate contact surfaces of the intermediate tubular workpiece. The system also includes a pair of induction coils positionable in the respective gaps, for heating the open ends of the two workpieces in a non-oxidizing atmosphere to provide hot portions therein extending to a predetermined distance from the contact surface, and for heating the intermediate workpiece in the non-oxidizing atmosphere to provide hot intermediate portions therein extending to preselected distances from the respective intermediate contact surfaces. Each of the induction coils is removable from the gap in which it is located once the hot portions and the hot intermediate portions are heated to at least a hot working temperature at which the metal is subject to plastic deformation. The system also includes a pair of workpiece clamps for moving each of the two workpieces to the intermediate workpiece, upon removal of the induction coils from the gaps, and pressing the contact surface on each of the two workpieces against the intermediate contact surfaces of the intermediate tubular workpiece respectively while the intermediate tubular workpiece is rotated about the axis, to cause plastic deformation in at least part of the hot portions and the hot intermediate portions, for bonding the two workpieces respectively with the intermediate tubular workpiece therebetween.

In another aspect, the invention provides a system for joining metal workpieces together that includes an intermediate clamp, for securely engaging an intermediate tubular workpiece positioned between two workpieces to define respective gaps between tubular open ends thereof, and for at least partially rotating the intermediate workpiece about an axis thereof, each of the two tubular workpieces having one or more contact surfaces at the open end thereof facing respective intermediate contact surfaces of the intermediate tubular workpiece. The system also includes a pair of induction coils positionable in the respective gaps, for heating the open ends of the two workpieces in a non-oxidizing atmosphere to provide hot portions therein extending to a predetermined distance from the contact surface, and for heating the intermediate workpiece in the non-oxidizing atmosphere to provide hot intermediate portions therein extending to preselected distances from the respective intermediate contact surfaces. Each induction coil is removable from the gap in which it is located once the hot portions and the hot intermediate portions are heated to at least a hot working temperature at which the metal is subject to plastic deformation. In addition, the system includes means for positioning the first, second, and intermediate workpieces such that, upon removal of the induction coils from the gaps, the contact surface on each of the two workpieces and the intermediate contact surfaces of the intermediate tubular workpiece are thereby pressed against each other while the intermediate tubular workpiece is rotated about the axis, to cause plastic deformation in at least part of the hot portions and the hot intermediate portions, for bonding the two workpieces and the intermediate tubular workpiece therebetween.

In another of its aspects, the invention provides a method of joining metal workpieces together including providing an intermediate tubular metal workpiece having intermediate contact surfaces thereon, the intermediate workpiece defining an axis thereof. First and second metal workpieces are also provided, each of the first and second workpieces having a tubular open end thereof and one or more contact surfaces at the open end. The intermediate workpiece is positioned between the open ends of the first and second workpieces to define respective first and second gaps between the first workpiece and the intermediate workpiece, and between the second workpiece and the intermediate workpiece, so that the contact surfaces on each of the first and second workpieces faces the intermediate contact surfaces of the intermediate workpiece respectively. Respective first and second induction coils are located in the first and second gaps respectively. The first and second induction coils are energized, to heat the open ends of the first and second workpieces in a non-oxidizing atmosphere to provide hot portions therein extending to a predetermined distance from the contact surface to at least a hot working temperature, and to heat the intermediate workpiece in the non-oxidizing atmosphere to provide hot intermediate portions therein extending to preselected distances from the respective intermediate contact surfaces to at least the hot working temperature. The first and second induction coils are removed from the first and second gaps. The intermediate workpiece is rotated about the axis thereof. The first and second workpieces are moved to press the contact surface thereof against the intermediate contact surfaces of the intermediate workpiece respectively while the intermediate workpiece is rotating, for plastic deformation of at least part of the metal in the hot portions and in the hot intermediate portions. The first, second, and intermediate workpieces are cooled to bond the first and second metal workpieces with the intermediate workpiece.

In yet another aspect, the invention provides a method of joining metal workpieces together. The method includes providing an intermediate tubular metal workpiece having intermediate contact surfaces thereon, the intermediate workpiece defining an axis thereof, and providing first and second metal workpieces, each of the first and second workpieces having a tubular open end thereof and one or more contact surfaces at the open end. The intermediate workpiece is positioned between the open ends of the first and second workpieces to define respective first and second gaps between the first workpiece and the intermediate workpiece, and between the second workpiece and the intermediate workpiece, so that the contact surface on each of the first and second workpieces faces the intermediate contact surfaces of the intermediate workpiece respectively. Respective first and second induction coils are located in the first and second gaps respectively. The first and second induction coils are energized, to heat the open ends of the two workpieces in a non-oxidizing atmosphere to provide hot portions therein extending to a predetermined distance from the contact surface to at least a hot working temperature, and to heat the intermediate workpiece in the non-oxidizing atmosphere to provide hot intermediate portions therein extending to preselected distances from the respective intermediate contact surfaces to at least the hot working temperature. The first and second induction coils are removed from the first and second gaps. The intermediate workpiece is rotated about the axis thereof. The contact surfaces of the first and second workpieces and the intermediate contact surfaces of the intermediate workpiece are pressed respectively against each other while the intermediate workpiece is rotating, for plastic deformation of at least part of the metal in the hot portions and in the hot intermediate portions. The hot portions of the first and second workpieces and the hot intermediate portions of the intermediate workpiece are cooled to provide, after cooling, respective first and second treated zones, each treated zone including a fine-grained microstructure bonding the first and second metal workpieces and the intermediate workpiece together.

In another of its aspects, the invention provides a pipe segment produced by a method of the invention.

In another of its aspects, the invention provides a kit of parts for forming a pipe segment according to a method of the invention. The kit of parts includes an intermediate metal tubular workpiece partially defined by an axis thereof, having intermediate contact surfaces. The kit of parts also includes first and second metal workpieces, each having an open tubular end. Each of the first and second metal workpieces also have one or more contact surfaces at the open end thereof. The intermediate tubular workpiece is positionable between the first and second metal workpieces for locating the intermediate contact surfaces to oppose the contact surfaces on the first and second workpieces.

BRIEF DESCRIPTION OF THE DRAWINGS

The invention will be better understood with reference to the attached drawings, in which:

FIG. 9A is a side view of an alternative embodiment of an intermediate workpiece of the invention, and alternative embodiments of first and second workpieces of the invention, drawn at a smaller scale;

FIG. 9B is a side view of the intermediate workpiece and the first and second workpieces of FIG. 9A after they have been bonded together to form an embodiment of the pipe segment of the invention;

FIG. 9C is a side view of an alternative embodiment of the intermediate workpiece of the invention, and the first and second workpieces of FIG. 9A;

FIG. 9D is a side view of the intermediate workpiece and the first and second workpieces of FIG. 9C after they have been bonded together to form another embodiment of the pipe segment of the invention;

FIG. 9E is a side view of another embodiment of the intermediate workpiece of the invention, and alternative embodiments of the first and second workpieces of the invention;

FIG. 9F is a side view of an embodiment of a contact surface including a chamfer portion and a main surface portion, drawn at a larger scale;

FIG. 9G is a side view of an embodiment of an intermediate contact surface including a chamfer portion and a main surface;

FIG. 10A is a cross-section of another alternative embodiment of the intermediate workpiece of the invention prior to its bonding with first and second workpieces, drawn at a smaller scale;

FIG. 10B is a cross-section of the intermediate workpiece and the first and second workpieces of FIG. 10A after their bonding together.

DETAILED DESCRIPTION

Figure 1:
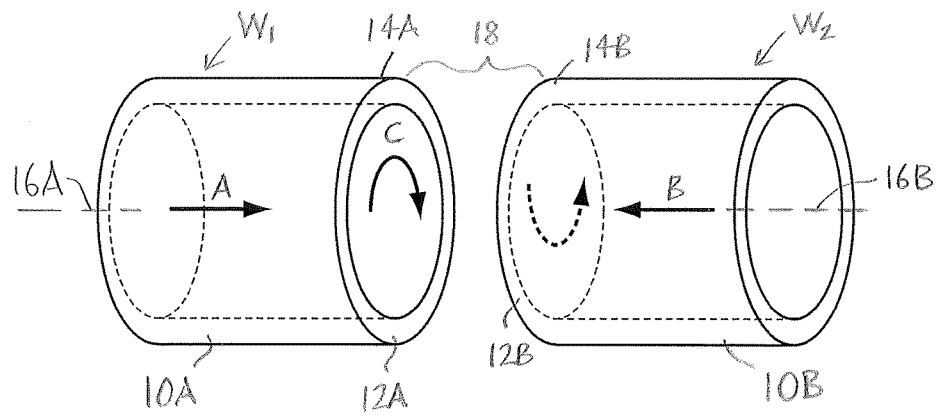
FIG. 1 (also described previously) is an isometric view of two workpieces of the prior art.
Figure 2:
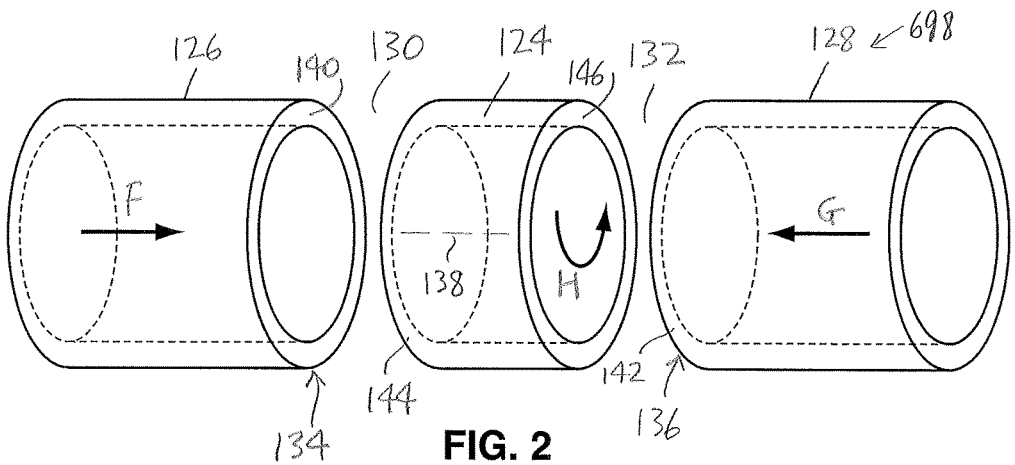
FIG. 2 is an isometric view of an embodiment of an intermediate workpiece of the invention positioned between first and second workpieces.

In the attached drawings, like reference numerals designate corresponding elements throughout. Reference is first made to FIGS. 2-6B and 8 to describe an embodiment of a system of the invention referred to generally by the numeral 120. As will be described, the system 120 is for joining metal workpieces together. In one embodiment, the system 120 preferably includes an intermediate clamp 122, for securely engaging an intermediate tubular workpiece 124 positioned between two workpieces 126, 128 to define respective gaps 130, 132 between tubular open ends 134, 136 thereof, and for at least partially rotating the intermediate workpiece 122 about an axis 138 thereof, as will be described. As can be seen in FIGS. 2 and 4A, each of the two workpieces 126, 128 preferably has one or more contact surfaces 140, 142 at the open ends 134, 136 thereof facing respective intermediate contact surfaces 144, 146 of the intermediate tubular workpiece 122. It is also preferred that the system 120 includes a pair of induction coils 148A, 148B positionable in the respective gaps 130, 132, for heating the open ends 134, 136 of the two workpieces 126, 128 in a non-oxidizing atmosphere to provide hot portions 150, 152 therein (FIG. 4A) extending to a predetermined distance "$D_1$", "$D_2$" from the contact surface 140, 142, and for heating the intermediate workpiece 122 in the non-oxidizing atmosphere to provide hot intermediate portions 154, 156 (FIG. 4) therein extending to preselected distances "$D_3$", "$D_4$" from the respective intermediate contact surfaces 144, 146. Each induction coil 148A, 148B is removable from the gap 130, 132 in which it is located once the hot portions 150, 152 and the hot intermediate portions 154, 156 are heated to at least a hot working temperature at which the metal is subject to plastic deformation. As can be seen in FIGS. 4A and 4B, the system 120 preferably also includes a pair of workpiece clamps 158, 160 for moving each of the two workpieces 126, 128 to the intermediate workpiece 124, upon removal of the induction coils 148A, 148B from the gaps, and pressing the contact surface 140, 142 on each of the two workpieces 126, 128 against the intermediate contact surfaces 144, 146 of the intermediate tubular workpiece 124 respectively while the intermediate tubular workpiece 124 is rotated about the axis 138, to cause plastic deformation in at least part of the hot portions 150, 152 and the hot intermediate portions 154, 156, for bonding the two workpieces 126, 128 respectively with the intermediate tubular workpiece 124 therebetween.

As can be seen in FIG. 4A, in one embodiment, the intermediate workpiece 124 preferably is positioned between the two workpieces 126, 128. The induction coils 148A, 148B are positioned in the gaps 130, 132 respectively, and electrical energy is provided to the induction coils 148A, 148B from a source thereof (not shown). The workpieces 124, 126, 128 are heated by the induction coils 148A, 148B, as described above, and when the workpieces 124, 126, 128 have been sufficiently heated, the induction coils 148A, 148B are removed, as indicated by arrows "$E_1$" and "$E_2$" (FIG. 4A). While the hot portions 150, 152 and the hot intermediate portions 154, 156 are still sufficiently hot to be plastically deformed (i.e., at the hot working temperature), the workpieces 126, 128 preferably are moved against the intermediate workpiece 124 (as indicated by arrows "F" and "G" in FIGS. 2, 4A, and 4B) while the intermediate workpiece 124 is rotated (as indicated by arrow "H" in FIGS. 2, 4A, and 4B). The contact surfaces and the intermediate contact surfaces engaged therewith respectively tend to adhere to each other because they are at the hot working temperature (at a minimum), subjecting the hot metal in the hot portions 150, 152 and the intermediate hot portions 154, 156 to shear.

Figure 4A:
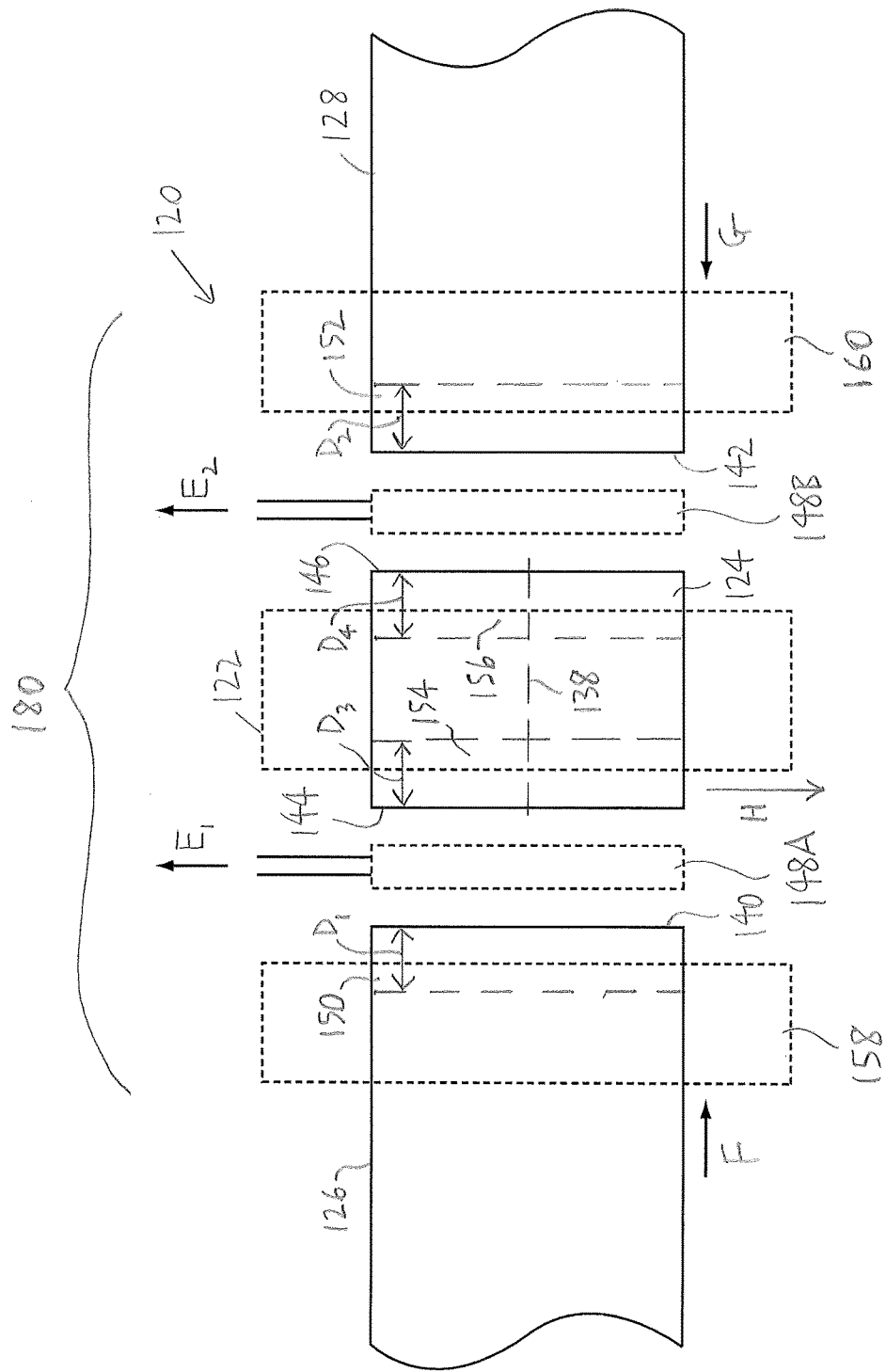
FIG. 4A is a top view of an embodiment of a system of the invention in which the intermediate workpiece of FIG. 2 is positioned between the first and second workpieces of FIG. 2 to define gaps therebetween in which induction coils are respectively located.
Figure 4B:
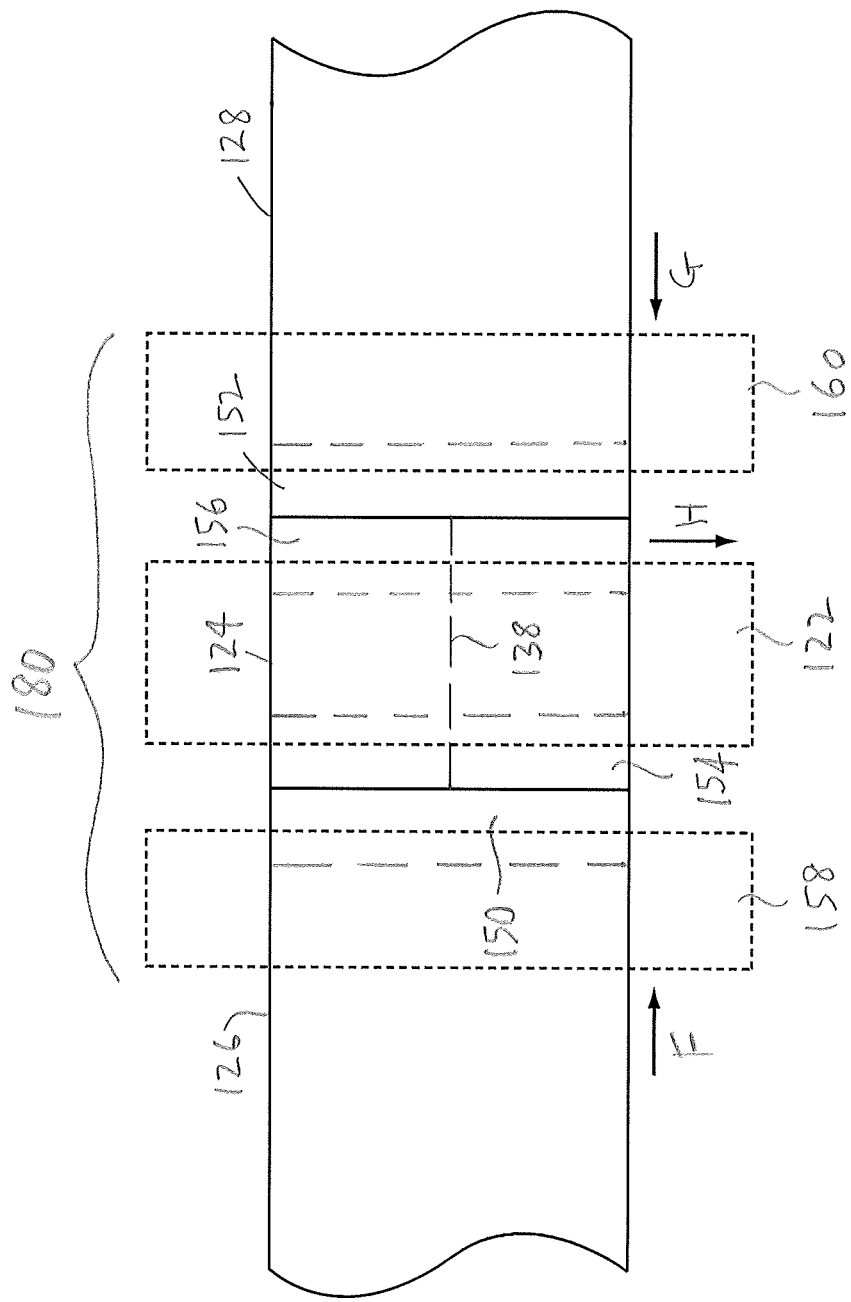
FIG. 4B is a top view of the system of FIG. 4A in which the first and second workpieces are both engaged with the intermediate workpiece, after heating thereof.
Figure 4C:
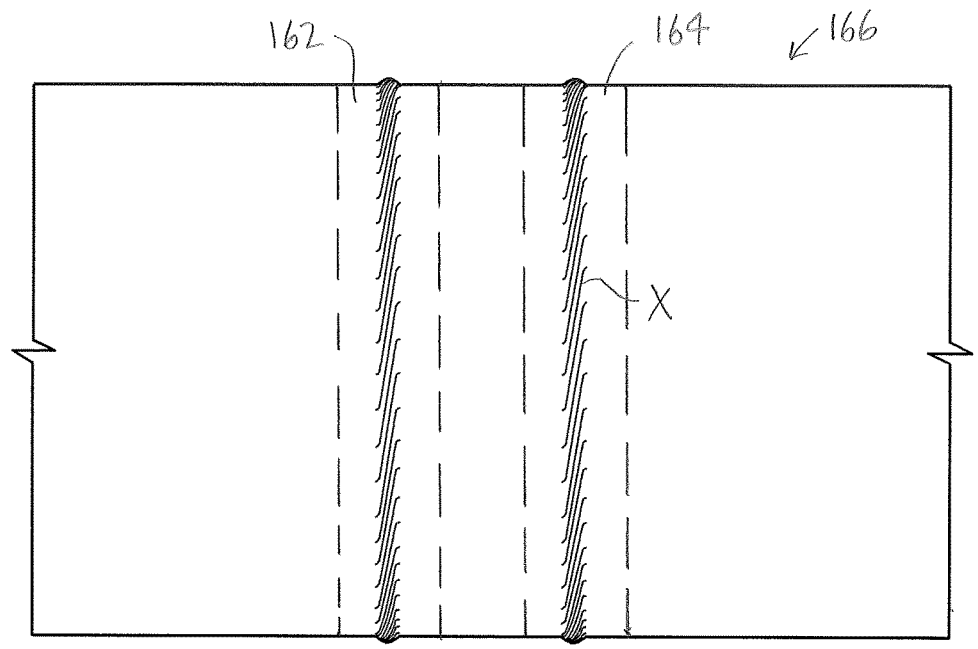
FIG. 4C is a side view of the intermediate workpiece engaged with the first and second workpieces while hot portions of the first and second workpieces and intermediate hot portions of the intermediate workpiece are hot and the intermediate workpiece is rotating, drawn at a larger scale.
Figure 4D:
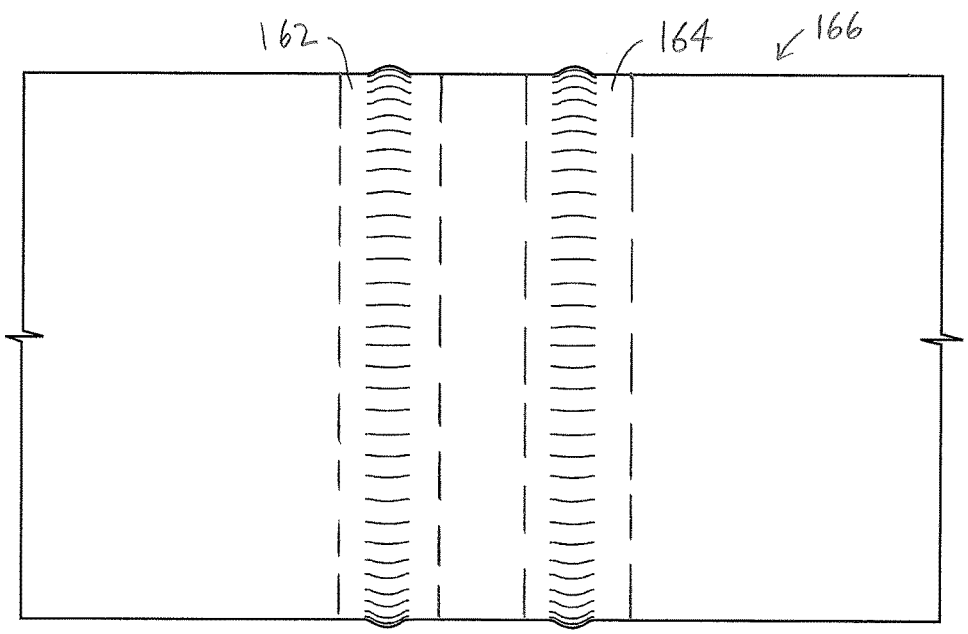
FIG. 4D is a side view of the workpieces of FIG. 4C after cooling, to bond the workpieces together, to form an embodiment of a pipe segment of the invention.

The workpieces 124, 126, and 128 are cooled to provide, after cooling, respective first and second treated zones 162, 164 including a fine-grained microstructure (FIG. 4D). The fine-grained microstructure bonds the workpieces 126, 128 respectively with the intermediate workpiece 124.

In FIG. 4B, the engagement of the hot portions 150, 152 with the intermediate hot portions 154, 156 while the intermediate workpiece 124 is rotating is shown. It is believed that when the hot portions 150, 152 and the intermediate hot portions 154, 156 engage each other respectively, they adhere together to an extent (because they are at the hot working temperature), and they are also simultaneously subjected to shear, due to the simultaneous rotation of the intermediate workpiece 124, resulting in the workpieces being bonded together, to form a single body. It is also believed that subjecting the metal in the hot portions 150, 152 and in the hot intermediate portions 154, 156 to shear results in a recrystallization of the metal material in the hot portions 150, 152 and the intermediate hot portions 154, 156. The interfaces 140, 144 and 142, 146 respectively between the workpieces 126, 128 and the intermediate workpiece 124 are replaced by an integral metal block, i.e., with no bond interface. The treated zones 162, 164 preferably are relatively fine-grained throughout and have substantial axial, radial, and circumferential uniformity.

It will be understood that FIGS. 4A-4D are intended to illustrate, schematically, the formation of an integral, unitary pipe segment 166 out of the workpieces 124, 126, 128. A cross-section of the pipe segment 166 is provided in FIG. 4E. In the arrangement illustrated in FIG. 4A, the three workpieces 124, 126, 128 are heated until the hot portions 150, 152 and the hot intermediate portions 154, 156 are at the hot working temperature, at a minimum. The induction coils are then removed, and the workpieces 126, 128 engage the intermediate workpiece 124 while it is rotating (FIG. 4B). As can be seen in FIG. 4B, when the first and second workpieces 126, 128 are first engaged with the intermediate workpiece 124, all three workpieces are separate elements. However, shortly after the hot portions of the workpieces 126, 128 and the hot intermediate portions of the intermediate workpiece 124 are engaged with each other as shown in FIG. 4B and as described above, the metal in the hot portions and the intermediate hot portions bonds together (as described above) so that the three workpieces become the single, unitary pipe segment 166, integrally formed.

FIG. 4C illustrates the transition from the three separate but engaged workpieces of FIG. 4B to the integral pipe segment 166 of FIG. 4D. Although the treated zones 162, 164 are shown in FIG. 4C as being, respectively, substantially coincident with the hot portion 150 and the hot intermediate portion 154 on one hand, and the hot portion 152 and the hot intermediate portion 156 on the other hand, it will be understood that this may not be so in practice. Specifically, in FIG. 4C, the first treated zone 162 is shown as being substantially coincident with the hot portion 150 and the hot intermediate portion 154, and the second treated zone 164 is shown as being substantially coincident with the hot portion 152 and the hot intermediate portion 156. It will be understood that the material in the treated zones 162, 164 is the same material as included in the workpieces, i.e., substantially in the hot portions 150, 152 and the hot intermediate portions 154, 156, although the material in the treated zones is generally thought to be relatively fine-grained.

In FIG. 4C, the process of the invention is illustrated where the pipe segment 166 is almost formed, as the rotation of the intermediate portion 124 has resulted in the shearing of certain material in the hot portions and the hot intermediate portions, represented by lines "X" to indicate shearing of material in the hot portions and the intermediate hot portions due to engagement of the first and second workpieces with the intermediate workpiece while the intermediate workpiece 124 is rotated.

In FIG. 4D, the embodiment of the process of the invention is complete, and the pipe segment 166 has been formed. In the embodiment illustrated in FIG. 4D, the pipe segment includes convex parts that are generally located at least partially in the treated zones.

It will be understood that the clamps 122, 158, 160 are omitted from FIGS. 4C and 4D for clarity of illustration.

The workpieces 124, 126, 128 preferably are made of any suitable material. Those skilled in the art would be aware of suitable materials. For example, the workpieces 124, 126, 128 may be made of a suitable steel.

Figure 4E:
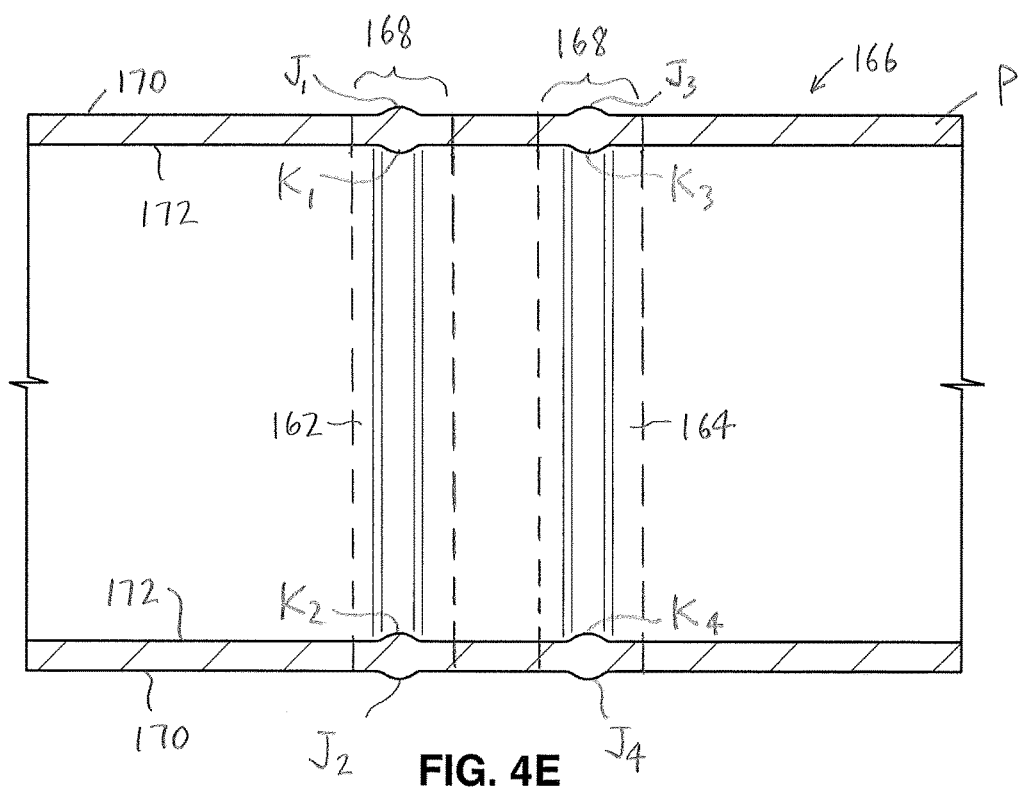
FIG. 4E is a cross-section of the pipe segment of FIG. 4D.

As can be seen in FIGS. 4D and 4E, the workpieces 124, 126, and 128 are bonded together (as described above) to form the pipe segment 166. The pipe segment 166 includes a pipe wall generally referred to as "P" (FIG. 4E). In one embodiment, the first and second treated zones 162, 164 preferably include a wall portion 168 of the wall "P" of the pipe segment 166 that is at least partially convex. This can be seen in FIG. 4E, in which convex parts of the wall portion 168 on an exterior side 170 of the wall "P" are identified for convenience as "$J_1$" to "$J_4$" inclusive and the convex parts of the wall portion 168 on an interior side 172 of the wall "P" are identified for convenience as "$K_1$" to "$K_4$" inclusive.

Figure 5A:
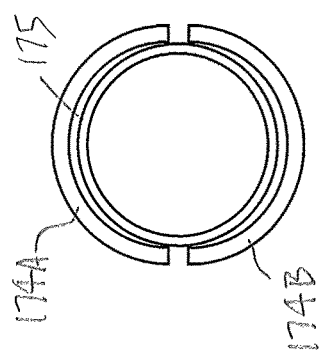
FIG. 5A is a cross-section of an embodiment of a clamp of the invention and a workpiece in which the clamp is shown in a disengaged position.
Figure 5B:
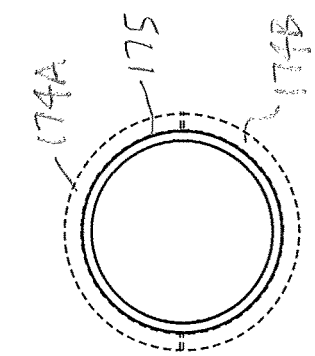
FIG. 5B is a cross-section of the clamp of FIG. 5A and the workpiece of FIG. 5A in which the clamp is shown in an engaged position.
Figure 6A:
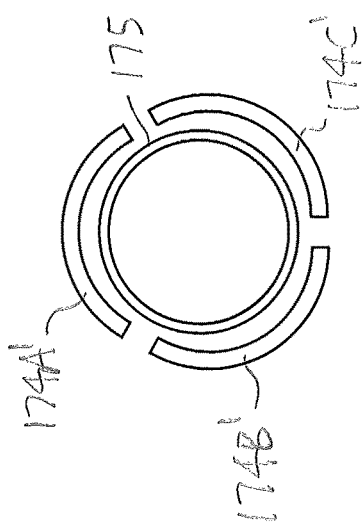
FIG. 6A is a cross-section of an alternative embodiment of the clamp of the invention and a workpiece in which the clamp is shown in a disengaged position.
Figure 6B:
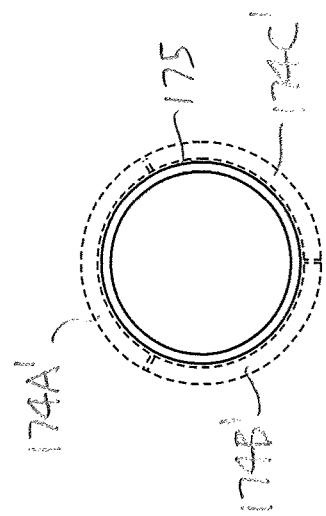
FIG. 6B is a cross-section of the clamp of FIG. 6A and the workpiece of FIG. 6A in which the clamp is shown in an engaged position.

For a workpiece with a relatively small inner diameter, clamps 174A, 174B may engage an exterior surface 175 of the workpiece 124, 126, 128 (FIGS. 5A, 5B). Preferably, the clamps 174A, 174B are moved inwardly from disengaged positions thereof (FIG. 5A) to engaged positions (FIG. 5B), in which the clamps 174A, 174B securely engage the exterior surface 175. Alternatively, three clamps 174A', 174B' and 174C' may be utilized (FIGS. 6A, 6B). It is preferred that the clamps 174A', 174B', and 174C' are moved inwardly from disengaged positions thereof (FIG. 6A) to engaged positions thereof (FIG. 6B). Where the workpiece's inner diameter is relatively large, clamps 176A, 176B may be mounted to engage an inner surface 177 of the workpiece. In this situation, another clamp means 178A, 178B, 178C, 178D engages the exterior surface 175 of the workpiece, to minimize the risk of the workpiece splitting when the clamps 176A, 176B engage the inner surface 177.

In one embodiment, and as described above, after heating, and removal of the induction coils, the first and second workpieces 126, 128 preferably are moved axially toward the rotating intermediate workpiece 124 (FIG. 2). Preferably, the first and second workpieces 126, 128 are not rotated.

It will be understood that, in one embodiment, the system 120 preferably includes a means 180 (FIGS. 4A, 4B) for positioning the first, second, and intermediate workpieces 126, 128, 124 such that, upon removal of the induction coils 148A, 148B from the gaps 130, 132, the contact surfaces 140, 142 on each of the two workpieces 126, 128 and the intermediate contact surfaces 144, 146 of the intermediate tubular workpiece 124 are thereby pressed against each other while the intermediate tubular workpiece 124 is rotated about the axis 138, to cause plastic deformation in at least part of the hot portions and the hot intermediate portions, for bonding the two workpieces with the intermediate tubular workpiece therebetween. Such means 180 may include, for example, the intermediate clamp 122 and the workpiece clamps 158, 160.

Figure 7:
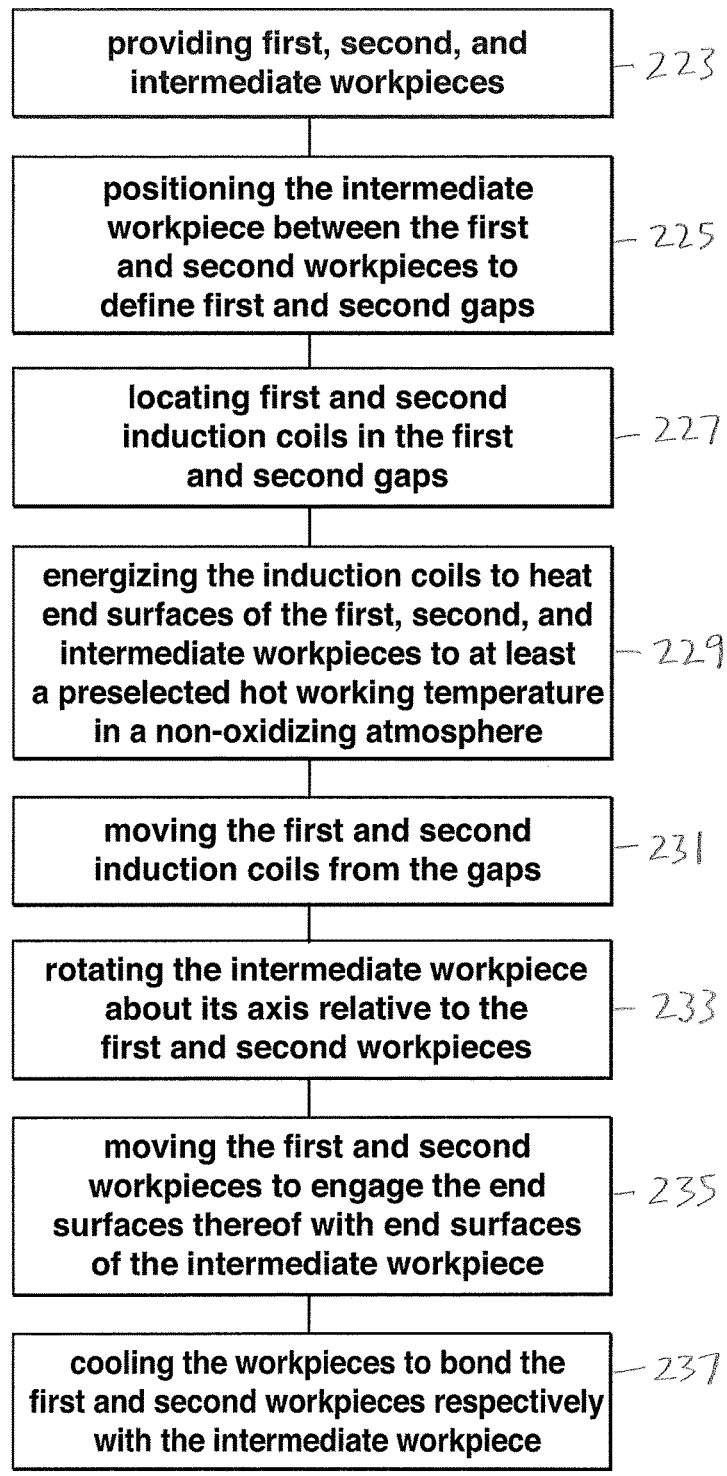
FIG. 7 is a flow chart schematically illustrating an embodiment of a method of the invention.
Figure 8:
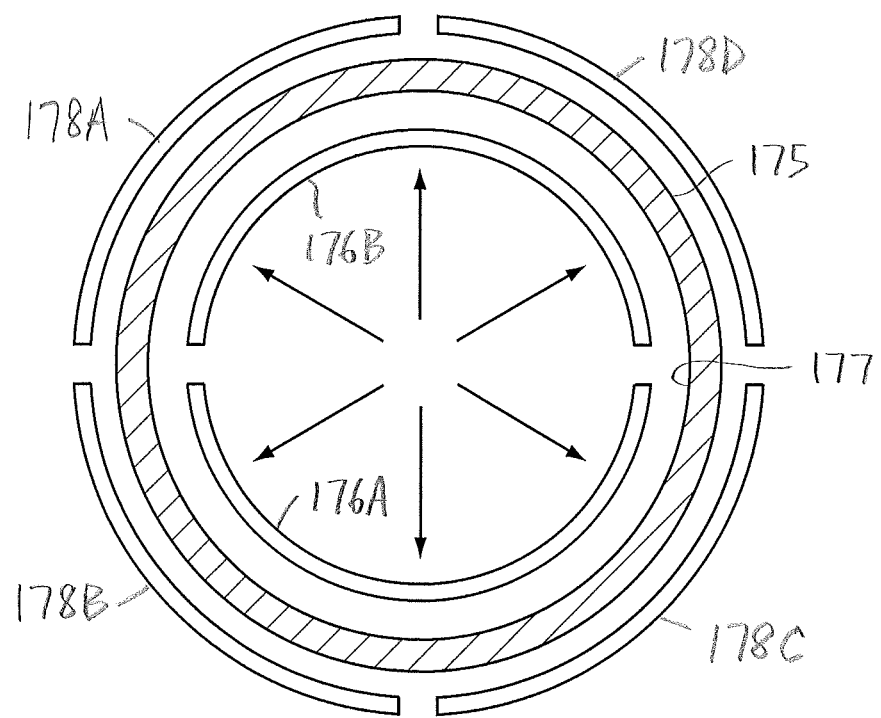
FIG. 8 is a cross-section illustrating an embodiment of an internally-mounted clamp device positioned inside a workpiece, drawn at a larger scale.

In use, the invention provides an embodiment of a method 221 of joining metal workpieces together. The method includes providing the intermediate tubular metal workpiece 124 having intermediate contact surfaces 144, 146 thereon, and the first and second workpieces 126, 128 (FIG. 7, step 223). The intermediate workpiece 124 is positioned between the open ends 134, 136 of the first and second workpieces 126, 128 to define the respective first and second gaps 130, 132 between the first workpiece 126 and the intermediate workpiece 124, and between the second workpiece 128 and the intermediate workpiece 124, so that the contact surfaces 140, 142 on the first and second workpieces 126, 128 face the intermediate contact surfaces 144, 146 of the intermediate workpiece 124 respectively (step 225). The first and second induction coils 148A, 148B are located in the first and second gaps 130, 132 respectively (step 227). The first and second induction coils 148A, 148B are energized, to heat the open ends 134, 136 of the first and second workpieces 126, 128 in a non-oxidizing atmosphere to provide the hot portions 150, 152 therein to at least a hot working temperature, and to heat the intermediate workpiece 124 in the non-oxidizing atmosphere to provide hot intermediate portions 154, 156 therein extending to preselected distances from the respective intermediate contact surfaces to at least the hot working temperature (step 229). The first and second induction coils 148A, 148B are then removed from the first and second gaps 130, 132 (step 231). The intermediate workpiece 124 is rotated about the axis 138 thereof (step 133). The first and second workpieces 126, 128 are moved to press the contact surfaces 140, 142 thereof against the intermediate contact surfaces 144, 146 of the intermediate workpiece 124 respectively while the intermediate workpiece 124 is rotating, for plastic deformation of at least part of the metal in the hot portions 150, 152 and in the hot intermediate portions 154, 156 (step 235). Finally, the first, second, and intermediate workpieces are cooled, to bond the first and second metal workpieces respectively with the intermediate workpiece (step 237).

As noted above, in one embodiment, the system 120 preferably includes the means 180 for positioning the workpieces. The means does not necessarily move the first and second workpieces 126, 128 toward the intermediate workpiece 124 in order to engage the workpieces 126, 128 with the intermediate workpiece 124. Accordingly, in one embodiment, the method of the invention preferably includes the step of pressing the contact surfaces 140, 142 of the first and second workpieces 126, 128 and the intermediate contact surfaces 144, 146 of the intermediate workpiece 124 respectively against each other while the intermediate workpiece 124 is rotating, for plastic deformation of at least part of the metal in the hot portions 150, 152 and in the hot intermediate portions 154, 156.

As can be seen in FIGS. 2 and 4A, in one embodiment, the contact surfaces 140, 142 on each of the first and second workpieces 126, 128 are substantially planar and positioned substantially orthogonal to the axis 138 of the intermediate workpiece 124. Preferably, the intermediate contact surfaces 144, 146 are substantially planar and are also positioned substantially orthogonal to the axis 138 of the intermediate workpiece 124.

When the contact surfaces 140, 142 are substantially planar, and the intermediate contact surfaces 144, 146 are also substantially planar, the pipe wall "P" includes the portion 168 thereof that is at least partially convex (FIGS. 4D, 4E). In practice, the convex parts of the portion 168 may be disadvantageous. In particular, the convex parts "$K_1$"-"$K_4$" on the interior side 172 of the wall "P" may interfere with the flow of fluid through the pipe segment 166, and in some applications, such interference with flow may be undesirable. For example, the flow of the fluid through the pipe segment 166 may be turbulent, at least in part, due to the convex parts, and this may be undesirable in certain circumstances.

In order to provide a bond, but in the absence of convex parts of the wall portion 168 that have resulted from the process resulting in the bonding, the contact surfaces of the first and second workpieces, and/or the intermediate contact surfaces, preferably are modified so that they are not defined by only one plane respectively.

As can be seen in FIGS. 9F and 9G, in one embodiment, the contact surfaces 140, 142 on each of the first and second workpieces 126, 128 preferably includes respective chamfer portions 182A, 182B. The contact surfaces 140, 142 preferably also include respective substantially planar main surfaces 184A, 184B respectively.

As illustrated in FIGS. 9A and 9G, it is preferred that the main surfaces 184A, 184B are positioned substantially orthogonal to the axis 138 of the intermediate workpiece 124. Preferably, the chamfer portions 182A, 182B are configured to at least partially form a substantially non-convex wall portion 168' (FIG. 9B) at least partially included in the first and second treated zones 162, 164. It would be appreciated by those skilled in the art that the chamfer portions represent a reduction in the amount of metal that is heated and engaged with other heated metal, thereby reducing the amount of material potentially available to be squeezed out, to form the convex parts. Where the contact surfaces and/or the intermediate contact surfaces include chamfer portions, it is intended that the wall portions in the vicinity of the first and second treated zones are substantially uniform, i.e., preferably without convex or concave parts. Those skilled in the art would also appreciate that the size and form of the chamfer portion may vary, depending on a number of factors. In general, the chamfer portion preferably is sized and formed so that the wall portion created when the first and second workpieces and the intermediate workpiece is substantially uniform, i.e., generally without convex or concave parts.

As indicated in FIGS. 9A and 9F, in one embodiment, the intermediate contact surfaces 144, 146 preferably include chamfer portions 186A, 186B respectively, and substantially planar main surfaces 188A, 188B respectively.

In one embodiment, and as illustrated in FIGS. 9A and 9B, all of the contact surfaces 140, 142 and the intermediate contact surfaces 144, 146 preferably include the chamfer portions. As indicated in FIG. 9B, the result is the wall portions 168' that are substantially non-convex. Preferably, the wall portions 168' are substantially planar, for less interference in flow of fluids through the pipe segment 166.

In an alternative embodiment illustrated in FIGS. 9C and 9D, only the contact surfaces 140, 142 preferably include the chamfer portions 182A, 182B. It is believed that this arrangement would also result in the non-convex wall portions 168' (FIG. 9D).

In another alternative embodiment illustrated in FIG. 9E, it is preferred that only the intermediate contact surfaces 144, 146 of the intermediate workpiece include the chamfer portions. In this embodiment, the contact surfaces 140, 142 of the first and second workpieces are substantially orthogonal to the axis 138 of the intermediate workpiece 124.

The size and positioning of the chamfer portion relative to the main surface varies, depending (among other things) on whether all of the contact surfaces 140, 142 and the intermediate contact surfaces 144, 146 include the chamfer portions.

Figure 3:
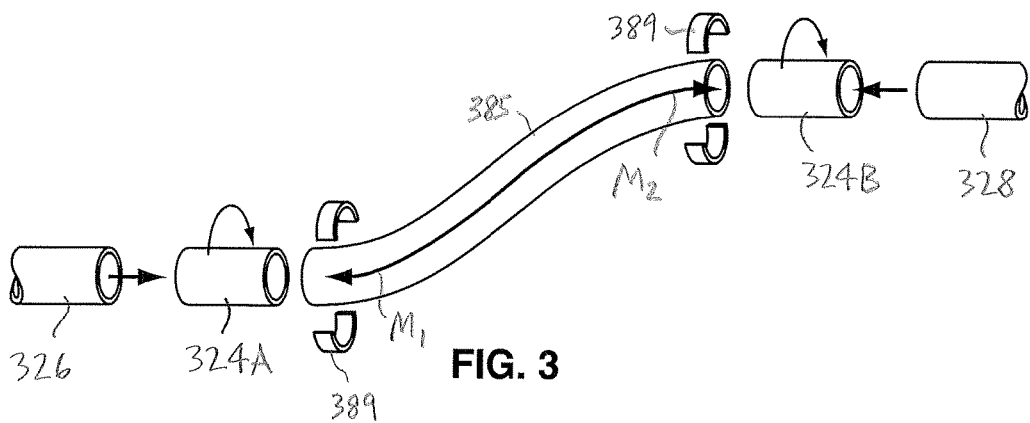
FIG. 3 is an isometric view of embodiments of the intermediate workpiece of the invention located between workpieces, drawn at a smaller scale.

Another example is illustrated in FIG. 3. In FIG. 3, intermediate workpieces 324A and 324B are positioned between workpieces 326 and 385, and between the workpiece 385 and workpiece 328, respectively. (It will be understood that the induction coils are omitted from FIG. 3 for clarity of illustration. It will also be understood that the workpieces are heated by the induction coils prior to engagement, as described above.) As can be seen in FIG. 3, and as indicated by arrows "M$_1$" and "M$_2$", the workpiece 385 may be pulled in one of two directions. It will be understood that the workpieces 324A, 324B are engaged with the workpiece 385 sequentially, i.e., first one, and then the other. For instance, if the workpiece 326 is first engaged with the intermediate workpiece 324A, the workpiece 385 is moved in the direction indicated by arrow "M$_1$", and the intermediate workpiece 324A is rotated. Subsequently, the intermediate workpiece 324B is engaged by the workpieces 385 and 328, and the intermediate workpiece 324B is then rotated. It will be understood that the intermediate workpiece 324B may, alternatively, be engaged by the workpieces 385 and 328 first.

Those skilled in the art would appreciate that, although the workpiece 385 as shown in FIG. 3 has a particular curvature, the system and method of the invention herein may be used with a workpiece that is curved pipe having any curvature. The workpiece 385 preferably is secured by suitable clamps 380. The clamps securing the other workpieces are omitted from FIG. 3 for clarity of illustration.

It would also be appreciated by those skilled in the art that the system and method of the invention may be used to effect repairs, e.g., where a part of the pipe in a pipeline is defective. For instance, the system and method of the invention may be utilized where the workpieces (e.g., the workpieces 126, 128 shown in FIG. 2) have been created by the removal of a defective pipe segment (not shown) located therebetween. Those skilled in the art would be aware of the manner in which this is done. For instance, the defective pipe segment (not shown) would be separated from the workpieces 126, 128 by cutting the pipe, and end surfaces of the workpieces 126, 128 are then prepared. In these circumstances, the new portion of pipe (i.e., to replace the defective pipe segment) is the intermediate workpiece 124. Preferably, the intermediate workpiece is then welded to the workpieces 126, 128 using the system and the method of induction welding of the invention, as described above.

Figure 11:
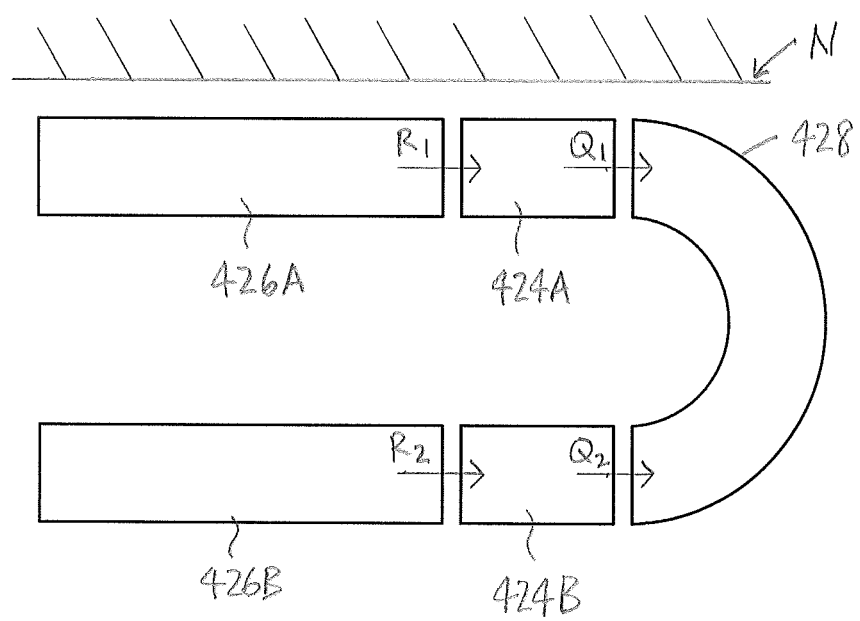
FIG. 11 is a top view of another alternative arrangement in which the intermediate workpiece of the invention may be utilized, drawn at a smaller scale.

Those skilled in the art would appreciate that the method and system of the invention may also be used in areas where there is insufficient space to weld a pipe using conventional methods. An example is illustrated in FIG. 11, in which a workpiece 426A is positioned proximal to a wall "N". Those skilled in the art would appreciate that the method and system of the invention may be used to bond the intermediate workpieces 424A, 424B with a U-shaped workpiece 428, and also to bond the workpieces 426A, 426B with the intermediate workpieces 424A, 424B.

It would also be appreciated by those skilled in the art that there may be circumstances in which substantially axial movement of the first or second workpieces is extremely difficult to accomplish. In some cases, movement of the first or the second workpiece in an axial direction may be impractical. Accordingly, the invention additionally includes an embodiment thereof in which one of the first and second workpieces is not axially movable, and the intermediate workpiece is axially moved (as well as rotated) in order to achieve engagement of the intermediate workpiece with the first and second workpieces. For instance, in FIG. 11, the workpiece 428 may not be axially movable, e.g., it may be secured to a device (not shown) that is fixed in place. Where the workpiece 428 is not axially movable, then it may (after suitable heating by induction coils (not shown) in the gaps) be engaged by the rotating intermediate workpieces 424A, 424B to effect bonds to form a pipe. The intermediate workpieces 424A, 424B are moved axially (as indicated by respective arrows "Q$_1$", "Q$_2$") to engage and to press against the open ends of the workpiece 428, while the intermediate workpieces 424A, 424B are also rotating about their respective axes. Shortly thereafter, and while the intermediate workpieces 424A, 424B are still rotating, the workpieces 426A, 462B are moved axially (as indicated by respective arrows "R$_1$", "R$_2$") to engage and to press against the intermediate workpieces 424A, 424B respectively. From the foregoing, it can be seen that one of the benefits provided by the invention herein is its ability to provide a secure bond where one of the workpieces cannot be axially moved. This situation may arise in practice where, for example, a pipeline or tubing terminates at a device that is fixed in place.

Those skilled in the art would appreciate that a larger diameter workpiece (e.g., greater than approximately 48 inches) may, for a variety of reasons, have a cross-section that is not circular, but instead is another, usually irregular, shape. For instance, a larger diameter workpiece may have a generally egg-shaped cross-section. Such a shape may result from minor deformation of the workpiece due to the influence of gravity over an extended period of time, e.g., if the workpiece is in storage for a relatively long time. In order to address this, in one embodiment, an intermediate workpiece 524 preferably includes a wall 590 that is substantially thicker than the walls 592 of the first and second workpieces 126, 128 that are to be bonded with the intermediate workpiece 524 (FIG. 10A). As can be seen in FIG. 10B, the workpieces 524, 126, 128 are bonded together to form a pipe segment 566. A wall part 594 of the pipe segment 566 that is at least partially formed from the intermediate workpiece 524 has a wall thickness 596 that is greater than a first wall thickness ("WT$_1$") of the first workpiece 526 and greater than a second wall thickness ("WT$_2$") of the second workpiece 528 (FIGS. 10A, 10B). As can be seen in FIG. 10B, one potential disadvantage of the pipe segment 566 is that its inner diameter is inconsistent along its length.

In one embodiment, the invention includes a kit of parts 698 (FIG. 2) for forming the pipe segment 166 according to the method of the invention herein. Preferably, the kit of parts 696 includes the intermediate metal tubular workpiece 124, and the first and second metal workpieces 126, 128. As described above, in one embodiment, contact surfaces and/or intermediate contact surfaces on the workpieces preferably include chamfer portions.

It will appreciated by those skilled in the art that the invention can take many forms, and that such forms are within the scope of the invention as described above. The scope of the claims should not be limited by the preferred embodiments set forth in the examples, but should be given the broadest interpretation consistent with the description as a whole.

I claim:

1. A system for joining metal workpieces together, the system comprising:
   an intermediate clamp, for securely engaging an intermediate tubular workpiece positioned between two workpieces to define respective gaps between tubular open ends thereof, and for at least partially rotating the intermediate tubular workpiece about an axis thereof, each of the two tubular workpieces having at least one contact surface at the open end thereof facing respective intermediate contact surfaces of the intermediate tubular workpiece;
   a pair of induction coils positionable in the respective gaps, for heating the open ends of the two workpieces in a non-oxidizing atmosphere to provide hot portions therein extending to a predetermined distance from said at least one contact surface, and for heating the intermediate tubular workpiece in the non-oxidizing atmosphere to provide hot intermediate portions therein extending to preselected distances from the respective intermediate contact surfaces;
   each said induction coil being removable from the gap in which it is located once the hot portions and the hot intermediate portions are heated to at least a hot working temperature at which the metal is subject to plastic deformation; and
   a pair of workpiece clamps for moving each of the two workpieces to the intermediate tubular workpiece, upon removal of the induction coils from the gaps, and pressing said at least one contact surface on each of the two workpieces against the intermediate contact surfaces of the intermediate tubular workpiece respectively while the intermediate tubular workpiece is rotated about the axis, to cause plastic deformation in at least part of the hot portions and the hot intermediate portions, for bonding the two workpieces respectively with the intermediate tubular workpiece therebetween.

2. A system for joining metal workpieces together, the system comprising:
   an intermediate clamp, for securely engaging an intermediate tubular workpiece positioned between two workpieces to define respective gaps between tubular open ends thereof, and for at least partially rotating the intermediate tubular workpiece about an axis thereof, each of the two tubular workpieces having at least one contact surface at the open end thereof facing respective intermediate contact surfaces of the intermediate tubular workpiece;
   a pair of induction coils positionable in the respective gaps, for heating the open ends of the two workpieces in a non-oxidizing atmosphere to provide hot portions therein extending to a predetermined distance from said at least one contact surface, and for heating the intermediate tubular workpiece in the non-oxidizing atmosphere to provide hot intermediate portions therein extending to preselected distances from the respective intermediate contact surfaces;
   each said induction coil being removable from the gap in which it is located once the hot portions and the hot intermediate portions are heated to at least a hot working temperature at which the metal is subject to plastic deformation; and
   means for positioning the first, second, and intermediate tubular workpieces such that, upon removal of the induction coils from the gaps, said at least one contact surface on each of the two workpieces and the intermediate contact surfaces of the intermediate tubular workpiece are thereby pressed against each other while the intermediate tubular workpiece is rotated about the axis, to cause plastic deformation in at least part of the hot portions and the hot intermediate portions, for bonding the two workpieces and the intermediate tubular workpiece therebetween together.

3. A method of joining metal workpieces together, the method comprising:
   (a) providing an intermediate tubular metal workpiece having intermediate contact surfaces thereon, the intermediate tubular metal workpiece defining an axis thereof;
   (b) providing first and second metal workpieces, each said first and second workpiece having a tubular open end thereof and at least one contact surface at the open end;
   (c) positioning the intermediate tubular metal workpiece between the open ends of the first and second workpieces to define respective first and second gaps between the first workpiece and the intermediate tubular metal workpiece, and between the second workpiece and the intermediate tubular metal workpiece, such that said at least one contact surface on each of the first and second workpieces faces the intermediate contact surfaces of the intermediate tubular metal workpiece respectively;
   (d) locating respective first and second induction coils in the first and second gaps respectively;
   (e) energizing the first and second induction coils, to heat the open ends of the first and second workpieces in a non-oxidizing atmosphere to provide hot portions therein extending to a predetermined distance from said at least one contact surface to at least a hot working temperature, and to heat the intermediate tubular metal workpiece in the non-oxidizing atmosphere to provide hot intermediate portions therein extending to preselected distances from the respective intermediate contact surfaces to at least the hot working temperature;
   (f) removing the first and second induction coils from the first and second gaps;
   (g) rotating the intermediate tubular metal workpiece about the axis thereof;
   (h) moving said first and second workpieces to press said at least one contact surface thereof against the intermediate contact surfaces of the intermediate tubular metal workpiece respectively while the intermediate tubular metal workpiece is rotating, for plastic deformation of at least part of the metal in the hot portions and in the hot intermediate portions; and (i) cooling the first, second, and intermediate tubular metal workpieces to bond the first and second metal workpieces with the intermediate tubular metal workpiece.

4. A method of joining metal workpieces together, the method comprising:
(a) providing an intermediate tubular metal workpiece having intermediate contact surfaces thereon, the intermediate tubular metal workpiece defining an axis thereof;
(b) providing first and second metal workpieces, each said first and second workpiece having a tubular open end thereof and at least one contact surface at the open end;
(c) positioning the intermediate tubular metal workpiece between the open ends of the first and second workpieces to define respective first and second gaps between the first workpiece and the intermediate tubular metal workpiece, and between the second workpiece and the intermediate tubular metal workpiece, such that said at least one contact surface on each of the first and second workpieces faces the intermediate contact surfaces of the intermediate tubular metal workpiece respectively;
(d) locating respective first and second induction coils in the first and second gaps respectively;
(e) energizing the first and second induction coils, to heat the open ends of the two workpieces in a non-oxidizing atmosphere to provide hot portions therein extending to a predetermined distance from said at least one contact surface to at least a hot working temperature, and to heat the intermediate tubular metal workpiece in the non-oxidizing atmosphere to provide hot intermediate portions therein extending to preselected distances from the respective intermediate contact surfaces to at least the hot working temperature;
(f) removing the first and second induction coils from the first and second gaps;
(g) rotating the intermediate tubular metal workpiece about the axis thereof;
(h) pressing said at least one contact surface of each of said first and second workpieces and the intermediate contact surfaces of the intermediate tubular metal workpiece respectively against each other while the intermediate tubular metal workpiece is rotating, for plastic deformation of at least part of the metal in the hot portions and in the hot intermediate portions; and
(i) cooling the hot portions of the first and second workpieces and the hot intermediate portions of the intermediate tubular metal workpiece to provide, after cooling, respective first and second treated zones, each said treated zone comprising a fine-grained microstructure bonding the first and second metal workpieces and the intermediate tubular metal workpiece together.

5. The method according to claim 4 in which said at least one contact surface on each of the first and second workpieces are substantially planar and positioned substantially orthogonal to the axis of the intermediate tubular metal workpiece, and the intermediate contact surfaces are substantially planar and positioned substantially orthogonal to the axis of the intermediate tubular metal workpiece.

6. The method according to claim 4 in which said at least one contact surface on each of the first and second workpieces comprises a chamfer portion and a main portion, the main portion comprising a substantially planar main surface positioned substantially orthogonal to the axis of the intermediate tubular metal workpiece, and the chamfer portion being configured to at least partially form a substantially non-convex wall portion at least partially located in the first and second treated zones.

7. A pipe segment produced by a method comprising:
(a) providing an intermediate tubular metal workpiece having intermediate contact surfaces thereon, the intermediate tubular metal workpiece defining an axis thereof;
(b) providing first and second metal workpieces, each said first and second workpiece having a tubular open end thereof and at least one contact surface at the open end;
(c) positioning the intermediate tubular metal workpiece between the open ends of the first and second workpieces to define respective first and second gaps between the first workpiece and the intermediate tubular metal workpiece, and between the second workpiece and the intermediate tubular metal workpiece, such that said at least one contact surface on each of the first and second workpieces faces the intermediate contact surfaces of the intermediate tubular metal workpiece respectively;
(d) locating respective first and second induction coils in the first and second gaps respectively;
(e) energizing the first and second induction coils, to heat the open ends of the two workpieces in a non-oxidizing atmosphere to provide hot portions therein extending to a predetermined distance from said at least one contact surface to at least a hot working temperature, and to heat the intermediate tubular metal workpiece in the non-oxidizing atmosphere to provide hot intermediate portions therein extending to preselected distances from the respective intermediate contact surfaces to at least the hot working temperature;
(f) removing the first and second induction coils from the first and second gaps;
(g) rotating the intermediate tubular metal workpiece about the axis thereof;
(h) pressing said at least one contact surface of each of said first and second workpieces and the intermediate contact surfaces of the intermediate tubular metal workpiece respectively against each other while the intermediate tubular metal workpiece is rotating, for plastic deformation of at least part of the metal in the hot portions and in the hot intermediate portions; and
(i) cooling the hot portions of the first and second workpieces and the hot intermediate portions of the intermediate tubular metal workpiece to provide, after cooling, respective first and second treated zones, each said treated zone comprising a fine-grained microstructure bonding the first and second metal workpieces and the intermediate tubular metal workpiece together.

8. The pipe segment according to claim 7 in which the hot portions of the first and second workpieces and hot intermediate portions of the intermediate tubular metal workpiece comprise, after cooling, respective first and second treated zones, each said treated zone comprising a fine-grained microstructure.

9. The pipe segment according to claim 8 in which the first and second treated zones comprise a wall portion that is at least partially non-convex.

10. The pipe segment according to claim 8 in which a wall part at least partially formed from the intermediate tubular metal workpiece has a wall thickness that is greater than a first wall thickness of the first workpiece and greater than a second wall thickness of the second workpiece.

11. A kit of parts for forming a pipe segment according to a method comprising:
(a) providing an intermediate tubular metal workpiece having intermediate contact surfaces thereon, the intermediate tubular metal workpiece defining an axis thereof;

(b) providing first and second metal workpieces, each said first and second workpiece having a tubular open end thereof and at least one contact surface at the open end;

(c) positioning the intermediate tubular metal workpiece between the open ends of the first and second workpieces to define respective first and second gaps between the first workpiece and the intermediate tubular metal workpiece, and between the second workpiece and the intermediate tubular metal workpiece, such that said at least one contact surface on each of the first and second workpieces faces the intermediate contact surfaces of the intermediate tubular metal workpiece respectively;

(d) locating respective first and second induction coils in the first and second gaps respectively;

(e) energizing the first and second induction coils, to heat the open ends of the two workpieces in a non-oxidizing atmosphere to provide hot portions therein extending to a predetermined distance from said at least one contact surface to at least a hot working temperature, and to heat the intermediate tubular metal workpiece in the non-oxidizing atmosphere to provide hot intermediate portions therein extending to preselected distances from the respective intermediate contact surfaces to at least the hot working temperature;

(f) removing the first and second induction coils from the first and second gaps;

(g) rotating the intermediate tubular metal workpiece about the axis thereof;

(h) pressing said at least one contact surface of each of said first and second workpieces and the intermediate contact surfaces of the intermediate tubular metal workpiece respectively against each other while the intermediate tubular metal workpiece is rotating, for plastic deformation of at least part of the metal in the hot portions and in the hot intermediate portions;

(i) cooling the hot portions of the first and second workpieces and the hot intermediate portions of the intermediate tubular metal workpiece to provide, after cooling, respective first and second treated zones, each said treated zone comprising a fine-grained microstructure bonding the first and second metal workpieces and the intermediate tubular metal workpiece together;

the kit of parts comprising:
an intermediate tubular metal workpiece partially defined by an axis thereof, comprising intermediate contact surfaces;
first and second metal workpieces, each having an open tubular end, each of said first and second metal workpieces having at least one contact surface at the open end thereof; and
the intermediate tubular metal workpiece being positionable between the first and second metal workpieces for locating the intermediate contact surfaces to oppose said at least one contact surface on each of the first and second workpieces.

12. The kit of parts according to claim 11 in which:
said at least one contact surface comprises at least one chamfer portion and a main portion, the main portion comprising a substantially planar main surface positioned substantially orthogonal to the axis of the intermediate tubular metal workpiece; and
said at least one chamfer portion is shaped to at least partially form a non-convex wall portion when the intermediate tubular metal workpiece and the first and second workpieces are formed into the pipe segment.

13. The kit of parts according to claim 12 in which said at least one chamfer portion comprises a chamfer surface thereof that is substantially planar and defines a predetermined oblique angle therebetween and the main surface of the main portion.

14. The kit of parts according to claim 11 in which:
each said intermediate contact surface on the intermediate tubular metal workpiece comprises at least one intermediate chamfer portion and an intermediate main portion, the intermediate main portion comprising a substantially planar intermediate main surface positioned substantially orthogonal to the axis of the intermediate tubular metal workpiece, and the intermediate chamfer portion being configured to form a substantially non-convex wall portion when the pipe segment is formed.

15. The kit of parts according to claim 14 in which the intermediate chamfer portion comprises an intermediate chamfer surface thereof that is substantially planar and defines a predetermined oblique angle therebetween and the main surface of the main intermediate portion.

16. The kit of parts according to claim 11 in which:
said at least one contact surface on each of the first and second workpieces comprises a chamfer portion and a main portion, the main portion comprising a substantially planar main surface positioned substantially orthogonal to the axis of the intermediate tubular metal workpiece;
each said intermediate contact surface on the intermediate tubular metal workpiece comprises an intermediate chamfer portion and an intermediate main portion, the intermediate main portion comprising a substantially planar main intermediate surface positioned substantially orthogonal to the axis of the intermediate tubular metal workpiece; and
said chamfer portions and said intermediate chamfer portions are configured to form a substantially non-convex wall portion when the pipe segment is formed.

17. The kit of parts according to claim 16 in which:
the chamfer portion comprises a chamfer surface thereof that is substantially planar and defines a predetermined oblique angle therebetween and the main surface of the main portion; and
the intermediate chamfer portion comprises an intermediate chamfer surface thereof that is substantially planar and defines a predetermined oblique angle therebetween and the main surface of the main intermediate portion.

* * * * *